United States Patent
Kim et al.

(10) Patent No.: US 10,872,172 B2
(45) Date of Patent: Dec. 22, 2020

(54) APPARATUS AND METHOD FOR PROCESSING DIGITAL VALUE

(71) Applicant: ICTK Co., Ltd., Gyeonggi-do (KR)

(72) Inventors: Dong Kyue Kim, Seoul (KR); Byong Deok Choi, Seoul (KR)

(73) Assignee: ICTK HOLDINGS CO., LTD., Seoul (KR)

(*) Notice: Subject to any disclaimer, the term of this patent is extended or adjusted under 35 U.S.C. 154(b) by 327 days.

(21) Appl. No.: 15/109,317

(22) PCT Filed: Dec. 10, 2014

(86) PCT No.: PCT/KR2014/012102
§ 371 (c)(1),
(2) Date: Jun. 30, 2016

(87) PCT Pub. No.: WO2015/102253
PCT Pub. Date: Jul. 9, 2015

(65) Prior Publication Data
US 2016/0335458 A1  Nov. 17, 2016

(30) Foreign Application Priority Data
Dec. 31, 2013 (KR) .................. 10-2013-0168558

(51) Int. Cl.
*G06F 21/71* (2013.01)
*G06F 21/73* (2013.01)
(Continued)

(52) U.S. Cl.
CPC .............. *G06F 21/71* (2013.01); *G06F 21/73* (2013.01); *G09C 1/00* (2013.01); *H04L 9/0866* (2013.01); *H04L 9/3278* (2013.01)

(58) Field of Classification Search
None
See application file for complete search history.

(56) References Cited

U.S. PATENT DOCUMENTS 8,525,169 B1 * 9/2013 Edelstein .............. H04L 9/3247
257/48
10,333,708 B1 * 6/2019 Diamant ............... H04L 63/061
(Continued)

FOREIGN PATENT DOCUMENTS

EP           2615571 A1    7/2013
JP        2003-131867 A    5/2003
(Continued)

OTHER PUBLICATIONS

Supplementary European Search Report for European Application No. EP 14876633.0 (PCT/KR2014/012102), dated Dec. 12, 2016 (8 pages).

(Continued)

*Primary Examiner* — Gregory J Toatley, Jr.
*Assistant Examiner* — Brandon J Becker
(74) *Attorney, Agent, or Firm* — Finnegan, Henderson, Farabow, Garrett & Dunner, LLP

(57) ABSTRACT

Provided is an apparatus for testing randomness of a digital value and processing the digital value. The digital value may include first bit sequences generated by a physically unclonable function (PUF). A grouping unit may generate a plurality of groups by segmenting the first bit sequence, and a processing unit may calculate a second bit sequence from the plurality of groups by performing a logical operation.

12 Claims, 6 Drawing Sheets

(51) Int. Cl.
  *H04L 9/08* (2006.01)
  *G09C 1/00* (2006.01)
  *H04L 9/32* (2006.01)

(56) References Cited

U.S. PATENT DOCUMENTS

| | | | | |
|---|---|---|---|---|
| 10,581,841 | B2 * | 3/2020 | Watanabe | H04L 9/0869 |
| 2007/0165208 | A1 * | 7/2007 | Cowburn | G03G 21/046 |
| | | | | 356/71 |
| 2007/0296403 | A1 * | 12/2007 | Mori | G11C 29/028 |
| | | | | 324/750.15 |
| 2011/0055649 | A1 * | 3/2011 | Koushanfar | G06F 21/577 |
| | | | | 714/729 |
| 2012/0183135 | A1 * | 7/2012 | Paral | H04L 9/0866 |
| | | | | 380/44 |
| 2012/0293354 | A1 * | 11/2012 | Suzuki | H04L 9/0866 |
| | | | | 341/173 |
| 2013/0147511 | A1 * | 6/2013 | Koeberl | H03K 19/23 |
| | | | | 326/8 |

FOREIGN PATENT DOCUMENTS

| | | | |
|---|---|---|---|
| JP | 2012-105056 | 5/2012 | |
| KR | 10-1139630 | 4/2012 | |
| WO | WO 2007/069190 A2 | 6/2007 | |
| WO | WO-2013025060 A2 * | 2/2013 | ............ H04L 9/321 |

OTHER PUBLICATIONS

European Search Report for European Application No. EP 14 876 633.0, dated Feb. 19, 2018 (6 pp.).

NIST Special Publication 800-90A, "Recommendation for Random Number Generation Using Deterministic Random Bit Generators," Elaine Barker and John Kelsey, Computer Security Division, Information Technology Laboratory, Computer Security, U.S. Dept. of Commerce, Jan. 2012 (136 pp.).

International Search Report for PCT/KR2014/012102 dated Feb. 16, 2015.

Partial Supplementary European Search Report issued by the European Patent Office dated May 24, 2019, in corresponding EP Patent Application No. 19155303.1 (8 pages).

Zhao, Yue-ai et al., "Load Balancing Algorithm With Modular and Exclusive-or Arithmetic," vol. 28, No. 6, Mar. 2007.

* cited by examiner

APPARATUS AND METHOD FOR PROCESSING DIGITAL VALUE

TECHNICAL FIELD

Embodiments relate to a security field, and more particularly, to an apparatus and method for determining randomness of a digital value generated by a physically unclonable function (PUF), and for processing the digital value so that the randomness may be enhanced if necessary.

BACKGROUND ART

A physically unclonable function (PUF) may provide an unpredictable digital value. Individual PUFs may provide different digital values, despite being manufactured through the same exact manufacturing process.

The PUF may be referred to as a physical one-way function (POWF) that is practically impossible to be duplicated, or a physical random function (PRF).

A characteristic of the PUF may be used to generate an encryption key for security and/or authentication. For example, a PUF may be used to provide a unique key to distinguish devices from one another.

Korean Patent Registration No. 10-1139630 (hereinafter, referred to as "'630 patent") proposes a method of implementing a PUF. The '630 patent discloses a method of generating a PUF by probabilistically determining whether an inter-layer contact or a via is generated between conductive layers or conductive nodes of a semiconductor, using a change in a semiconductor manufacturing process.

In one of embodiments disclosed in the '630 patent, whether a via is formed between conductive layers may be randomly determined by designing the via to have a small size. Accordingly, a random digital value is generated. It is impossible to artificially suppose the random digital value.

To use a digital value provided by the PUF in a security field based on a change in the process, individual bit values included in the digital value may desirably correspond to true random numbers, instead of being biased to either "0" or "1."

However, the individual bit values may be biased to either "0" or "1." Accordingly, there is a desire for a method of guaranteeing randomness of a digital value provided by the PUF.

DISCLOSURE OF INVENTION

Technical Solutions

An aspect provides a digital value processing apparatus that may process a first digital value generated by a physically unclonable function (PUF), and that may generate a second digital value with a greatly enhanced entropy.

According to an aspect, there is provided a digital value processing apparatus including a grouping unit to generate a plurality of groups by segmenting a first bit sequence included in a first digital value, and a processing unit to calculate a second bit sequence from the groups by performing a logical operation, and to generate a second digital value including the second bit sequence.

The logical operation may be an eXclusive OR (XOR) operation.

The digital value processing apparatus may further include a determining unit to read the first bit sequence, and to determine whether the first digital value has a predesignated level of randomness.

The predesignated level of randomness may satisfy a condition that a P-value calculated for the first bit sequence exceeds a predesignated threshold.

The determining unit may determine a parameter associated with the segmenting, by reading the first bit sequence.

The parameter may be a number of the generated groups.

The determining unit may include a reading unit to read the first bit sequence and to calculate a ratio of bit values "1" and "0" included in the first bit sequence, and a calculating unit to calculate the parameter to allow a condition that a P-value for the second bit sequence calculated based on the ratio exceeds a predesignated threshold to be satisfied.

Another aspect provides a digital value processing method that may process a first digital value generated by a PUF, and that may generate a second digital value with a greatly enhanced entropy.

According to an aspect, there is provided a digital value processing method including generating, by a grouping unit of a digital value processing apparatus, a plurality of groups by segmenting a first bit sequence included in a first digital value generated by a PUF, and calculating, by a processing unit of the digital value processing apparatus, a second bit sequence from the groups by performing a logical operation, and generating a second digital value including the second bit sequence.

The logical operation may be an XOR operation.

The digital value processing method may further include reading, by a determining unit of the digital value processing apparatus, the first bit sequence, and determining whether the first digital value has a predesignated level of randomness.

The predesignated level of randomness may satisfy a condition that a P-value calculated for the first bit sequence exceeds a predesignated threshold.

The digital value processing method may further include determining, by the determining unit, determining a parameter associated with the segmenting, by reading the first bit sequence.

The parameter may be a number of the generated groups. The determining may include reading the first bit sequence and calculating a ratio of bit values "1" and "0" included in the first bit sequence, and calculating the parameter to allow a condition that a P-value for the second bit sequence calculated based on the ratio exceeds a predesignated threshold to be satisfied.

BEST MODE FOR CARRYING OUT THE INVENTION

Figure 1:
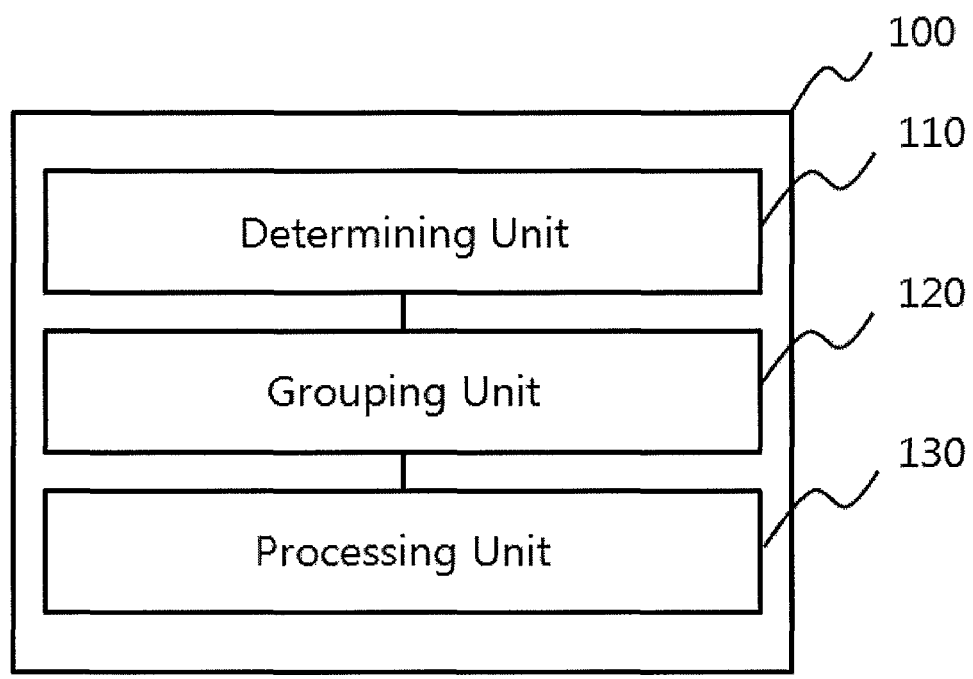
FIG. 1 is a block diagram illustrating a digital value processing apparatus according to an embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a block diagram illustrating a digital value processing apparatus 100 according to an embodiment.

The digital value processing apparatus 100 may process a first digital value A generated by a physically unclonable function (PUF), and may generate a second digital value B with an entropy and/or randomness that are greatly enhanced.

The first digital value A generated by the PUF may be received. The first digital value A may include an m-bit sequence of m bits, for example, bits $a_1$ through $a_m$, and m may be a natural number.

A determining unit 110 in the digital value processing apparatus 100 may process the m-bit sequence, and may determine a parameter to allow randomness to be guaranteed.

For example, the processing of the m-bit sequence may indicate segmenting the m-bit sequence to generate n groups, and calculating an n-bit sequence of n bits by performing a logical operation of bits included in each of the n groups. In this example, n may be a natural number. In the present disclosure, the calculated n-bit sequence may be referred to as the second digital value B.

The parameter determined by the determining unit 110 may be, for example, a number i of bits included in each of groups generated by the segmenting, and i may be a natural number.

Through the above processing, the randomness or the entropy of the second digital value B may be greatly enhanced.

Hereinafter, the above processing process and an entropy enhancement effect will be further described.

For example, a probability that each of the bits $a_1$ through $a_m$ included in the first digital value A has a bit value "1" may be assumed as p, and a probability that each of the bits $a_1$ through $a_m$ has a bit value "0" may be assumed as q. In this example, a sum of the probabilities p and q may be "1," and each of the probabilities p and q may be a real number equal to or greater than "0" and equal to or less than "1."

A grouping unit 120 in the digital value processing apparatus 100 may generate at least n groups, each including i bits, by segmenting the m-bit sequence. When the second digital value B including a random sequence required to be generated has n bits, i may be a natural number selected by the determining unit 110 from among values equal to or less than a value of "m/n."

A processing unit 130 in the digital value processing apparatus 100 may generate a 1-bit digital value by performing a logical operation of i bits included in a single group. One bit may be generated from each of the n groups and accordingly, an n-bit digital value may be generated.

The logical operation may be, for example, an eXclusive OR (XOR) operation calculated based on an input of the i bits. However, the XOR operation is merely an example of the logical operation and accordingly, other arbitrary logical operations may also be used.

A probability that an output value of an XOR operation corresponding to an input of i bits in a single group is "1" may be represented as shown in Equation 1 below.

$$P(1)_{p,i} = \frac{1}{2} - \frac{1}{2}(1-2p)^i$$ [Equation 1]

In Equation 1, when a value of i increases, a probability that a bit value determined as an output of the XOR operation is "1" may converge to 50%. Accordingly, the output of the XOR operation may be quickly closer to 50% due to an increase in the value of i, even when a probability that each of i input bits included in a single group has a value of "1" is not 50%. Thus, an entropy may be greatly increased.

The above result is listed in Table 1 below.

TABLE 1

| | p | | | | | | | | |
|---|---|---|---|---|---|---|---|---|---|
| i | 10% | 20% | 30% | 40% | 50% | 60% | 70% | 80% | 90% |
| 2-bit | 18% | 32% | 42% | 48% | 50% | 48% | 42% | 32% | 18% |
| 3-bit | 24% | 39% | 47% | 50% | 50% | 50% | 53% | 61% | 76% |
| 4-bit | 30% | 44% | 49% | 50% | 50% | 50% | 49% | 44% | 30% |
| 5-bit | 34% | 46% | 49% | 50% | 50% | 50% | 51% | 54% | 66% |
| 6-bit | 37% | 48% | 50% | 50% | 50% | 50% | 50% | 48% | 37% |
| 7-bit | 40% | 49% | 50% | 50% | 50% | 50% | 50% | 51% | 60% |
| 8-bit | 42% | 49% | 50% | 50% | 50% | 50% | 50% | 49% | 42% |

As shown in Table 1, when groups, each including i bits, are generated by segmenting the m-bit sequence in the first digital value A provided by the PUF, a probability that a result value of the XOR operation is "1" is much closer to 50%, even when each of bits included in the first digital value A is biased to either a bit value "1" or "0." For example, a probability that a result value obtained by performing the XOR operation of each of 8 bits in a group (that is, i=8) is "1" is 49%, despite only a 20% probability that a bit $a_k$ included in the first digital value A has a bit value "1" (that is, p=0.2).

Figure 2:
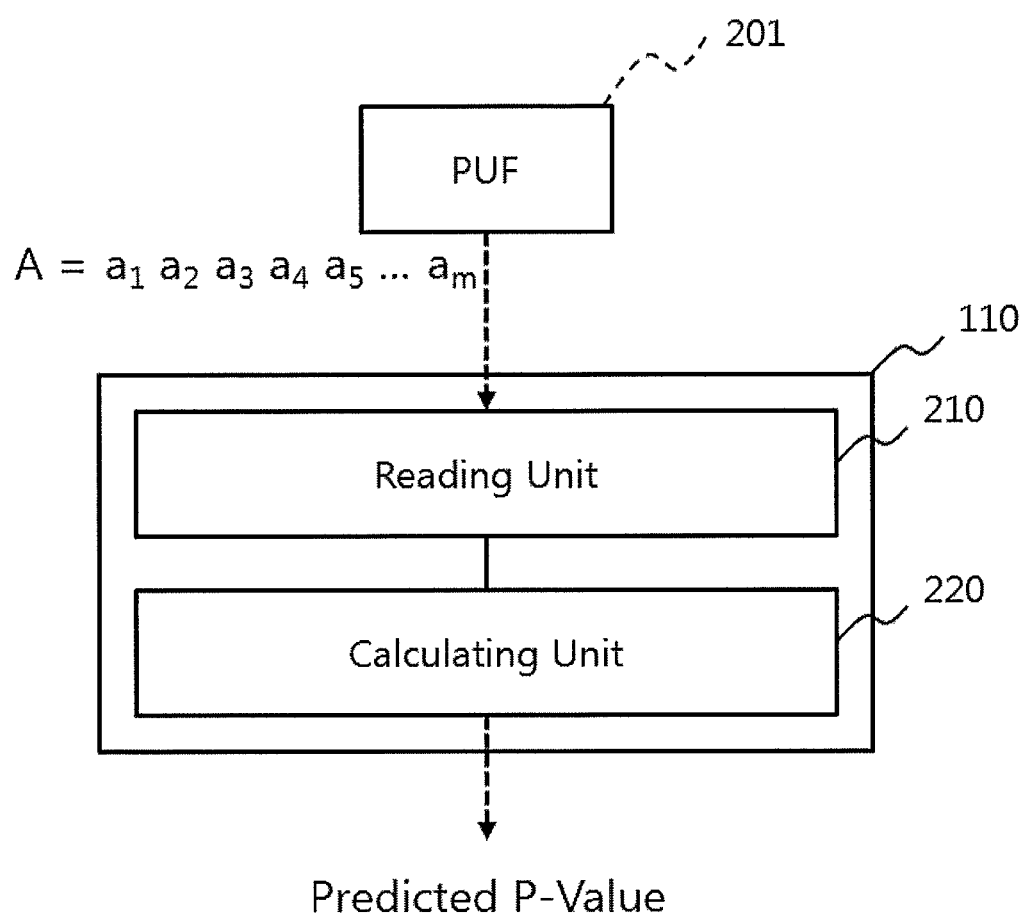
FIG. 2 illustrates an example of a configuration and an operation of a determining unit according to an embodiment.

FIG. 2 illustrates an example of a configuration and an operation of the determining unit 110 of FIG. 1.

The determining unit 110 may receive a first digital value A from a PUF 201. The first digital value A generated by the PUF 201 may include an m-bit sequence of m bits, for example, bits $a_1$ through $a_m$, and m may be a natural number.

The PUF 201 may include m vias formed between conductive layers of a semiconductor. Each of the bits $a_1$ through $a_m$ may be determined to have a digital value "1" or "0," depending on whether each of the m vias shorts the conductive layers.

As described above, a probability that each of the bits $a_1$ through $a_m$ has a bit value "1" may be assumed as p, and a probability that each of the bits $a_1$ through $a_m$ has a bit value "0" may be assumed as q.

Each of the m vias in the PUF 201 may have a size expected so that the probabilities p and q may have the same value, for example, "0.5" (p=q=0.5). However, despite the above expectation, in an actually manufactured PUF 201, the probabilities p and q may not be equal to each other for various reasons. This is recognized as a problem to be solved in order to utilize a random digital value generated by the PUF 201 in various industry fields, for example, a security field.

A reading unit 210 in the determining unit 110 may read the bits $a_1$ through $a_m$ included in the first digital value A generated by the PUF 201. Through the reading, 1s and 0s included in the bits $a_1$ through $a_m$ may be counted. During the counting, the probability p may be a ratio of a number of bits with a bit value "1" to the m bits in the m-bit sequence.

Additionally, a calculating unit 220 in the determining unit 110 may determine whether the bits $a_1$ through $a_m$ pass a predetermined randomness test, based on the number of 1s and the number of 0s that are obtained by the counting.

A large number of schemes for testing randomness are providing a need to pass a test for similarity between a frequency of occurrence of "0" and a frequency of occurrence of "1," to determine whether a generated digital value corresponds to a true random number.

As stated in "A Statistical Test Suite for Random and Pseudorandom Number Generators for Cryptographic Applications" of the National Institute of Standards and Technology (NIST) Special Publication 800-22, random numbers used in a security field need to pass a frequency test or a Monobit test.

The calculating unit 220 may calculate and/or predict a P-value based on the NIST 800-22 for the first digital value A generated by the PUF 201, and may determine whether the first digital value A passes the frequency test.

Accordingly, whether a digital value provided by the PUF 201 is likely to pass a test may be determined in advance. Thus, it is possible to predict a defect rate, and to determine a group size to be used by the grouping unit 120 and the processing unit 130 of FIG. 1 in order to pass a test.

Hereinafter, calculating of a P-value based on the NIST 800-22 when the bits $a_1$ through $a_m$ included in the first digital value A generated by the PUF 201 are input, will be further described.

$$S_m = X_1 + X_2 \ldots + X_m, \text{ where } X_k = 2a_k - 1 \qquad \text{[Equation 2]}$$

For example, the calculating unit 220 may obtain values of $X_k$ for a bit $a_k$ ($1 \leq k \leq m$), and may calculate a value of $S_m$ by adding the values of $X_k$, based on Equation 2. In this example, when the bit $a_k$ is "1," a value of $X_k$ may be set to "1." When the bit $a_k$ is "0," the value of $X_k$ may be converted to "4." The value of $S_m$ may be calculated by adding all the values of $X_k$ calculated for the m-bit sequence.

When a number of 1s is greater than a number of 0s in a bit sequence, the value of Sm may be a positive number. Conversely, when the number of 0s is greater than the number of is in the bit sequence, the value of Sm may be a negative number. When a difference between the number of 1s and the number of 0s increases, an absolute value of Sm may increase.

$$S_{obs} = \frac{|S_m|}{\sqrt{m}} \qquad \text{[Equation 3]}$$

$$\text{P-value} = \text{erfc}\left(\frac{S_{obs}}{\sqrt{2}}\right) \qquad \text{[Equation 4]}$$

Additionally, the calculating unit 220 may calculate the P-value, based on Equations 3 and 4. In Equation 4, erfc denotes a complementary error function. The NIST 800-22 provides a decision rule in which the first digital value A is determined as a random sequence only when the calculated P-value is greater than a predetermined threshold. The predetermined threshold may be, for example, "0.1" or "0.01," and different thresholds may be set based on a level of required randomness.

The calculating unit 220 may check randomness of the first digital value A provided by the PUF 201, through the above calculating.

The above process will be further described with reference to FIG. 1.

According to the above-described embodiment, n groups, each including i bits, may be generated by segmenting a bit sequence with a probability p that each of bits in the bit sequence has a bit value "1," and a 1-bit sequence may be calculated for each of the n groups by performing an XOR operation of i bits in each of the n groups. A second digital value B including n bits corresponding to the n groups may be generated.

Referring to Equation 1, a probability that each of the n bits in the second digital value B has a bit value "1" may be "$\frac{1}{2} - \frac{1}{2}(1-2p)^i$."

A P-value of the second digital value B may be calculated based on Equations 2 through 4.

$$\text{P-value} = \text{erfc}\left(\sqrt{\frac{n}{2}}|2p-1|^i\right) \qquad \text{[Equation 5]}$$

Based on Equation 5, the P-value of the second bit sequences B including n bits generated by generating groups, each including i bits, by segmenting a given first bit sequence, and by performing an XOR operation of each of the groups, may be calculated in advance.

When a bit number n of a random sequence to be used in a security field, and the like is determined, the calculating unit 220 may calculate a group size i required to pass a randomness test, that is, the NIST 800-22. The above process will be further described with reference to FIG. 3.

Figure 3:
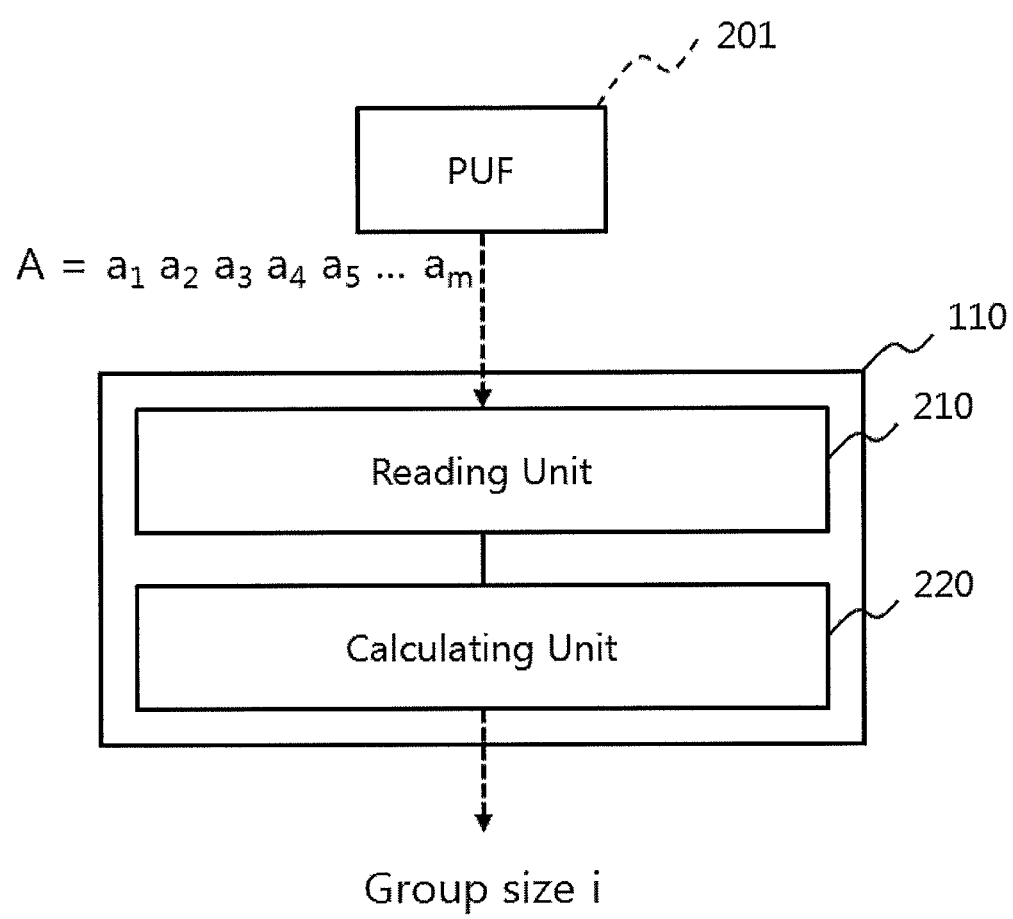
FIG. 3 illustrates another example of a configuration and an operation of the determining unit according to an embodiment.

FIG. 3 illustrates another example of a configuration and an operation of the determining unit 110 of FIG. 1.

When a PUF 201 provides a first digital value A including an m-bit sequence of m bits, that is, bits $a_1$ through $a_m$, the reading unit 210 may count is of the bits $a_1$ through $a_m$, and may calculate the probability p.

For example, when the second digital value B required for use in the security field includes n bits, the P-value may be calculated by substituting "n" and the probability p into Equation 5. Accordingly, the group size i required to pass the randomness test based on the decision rule may be calculated.

In another example, when a bit number n of the required second digital value B, and a probability p that a bit number for a PUF provided in a specific process is "1" are given, the group size i may be calculated. Accordingly, for a single PUF, at least "n*i" via holes may be determined to need to be formed.

The above operation process will be further described with reference to FIGS. 4 and 5.

Figure 4:
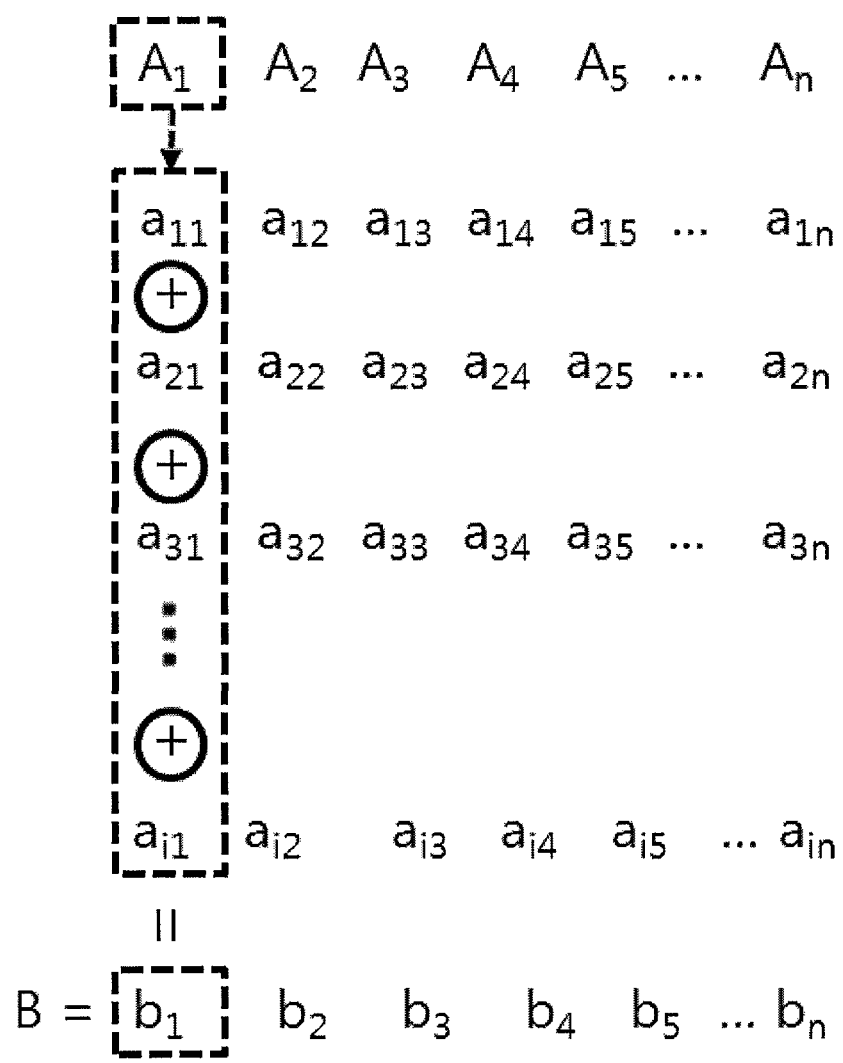
FIG. 4 illustrates an operation of each of a grouping unit and a processing unit according to an embodiment.

FIG. 4 illustrates an operation of each of the grouping unit 120 and the processing unit 130 of FIG. 1.

Referring to FIG. 4, the grouping unit 120 may generate n groups, that is, groups $A_1$ through $A_n$ by segmenting a bit sequence included in the first digital value A.

Each of the n groups may include i bits.

The processing unit 130 may perform an XOR operation of the i bits in each of the n groups, and may calculate a single digital bit $b_k$. For example, a digital bit $b_1$ may be calculated by inputting i bits included in the group $A_1$ to the XOR operation.

Accordingly, the second digital value B including n bits corresponding to the n groups may be generated.

As described above, an entropy of the second digital value B may be significantly increased. Accordingly, the second digital value B may be suitable for use in the security field.

Figure 5:
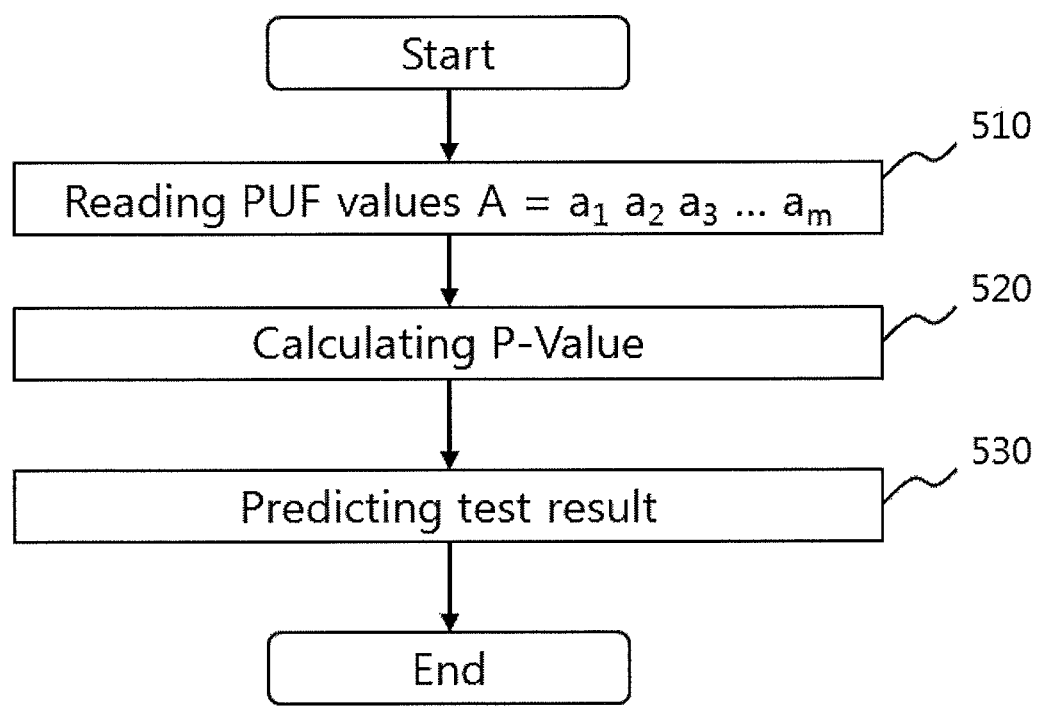
FIG. 5 is a flowchart illustrating a digital value processing method according to an embodiment.

FIG. 5 is a flowchart illustrating an example of a digital value processing method according to an embodiment.

Referring to FIG. 5, in operation 510, the reading unit 210 of FIG. 2 may read a first digital value A provided by the PUF 201 of FIG. 2. The first digital value A may include an m-bit sequence of m bits.

In operation 520, the calculating unit 220 of FIG. 2 may calculate a P-value of the first digital value A, using Equations 2 through 4.

In operation 530, the calculating unit 220 may determine whether the first digital value A is likely to pass a random test, by comparing the calculated P-value to a threshold based on a decision rule that is given in advance. The threshold may be, for example, "0.1" or "0.01."

Accordingly, whether a digital value provided by the PUF 201 is likely to pass a test may be determined in advance. Thus, it is possible to predict a defect rate, and to determine a group size to be used by the grouping unit 120 and the processing unit 130 of FIG. 1 in order to pass the test.

Figure 6:
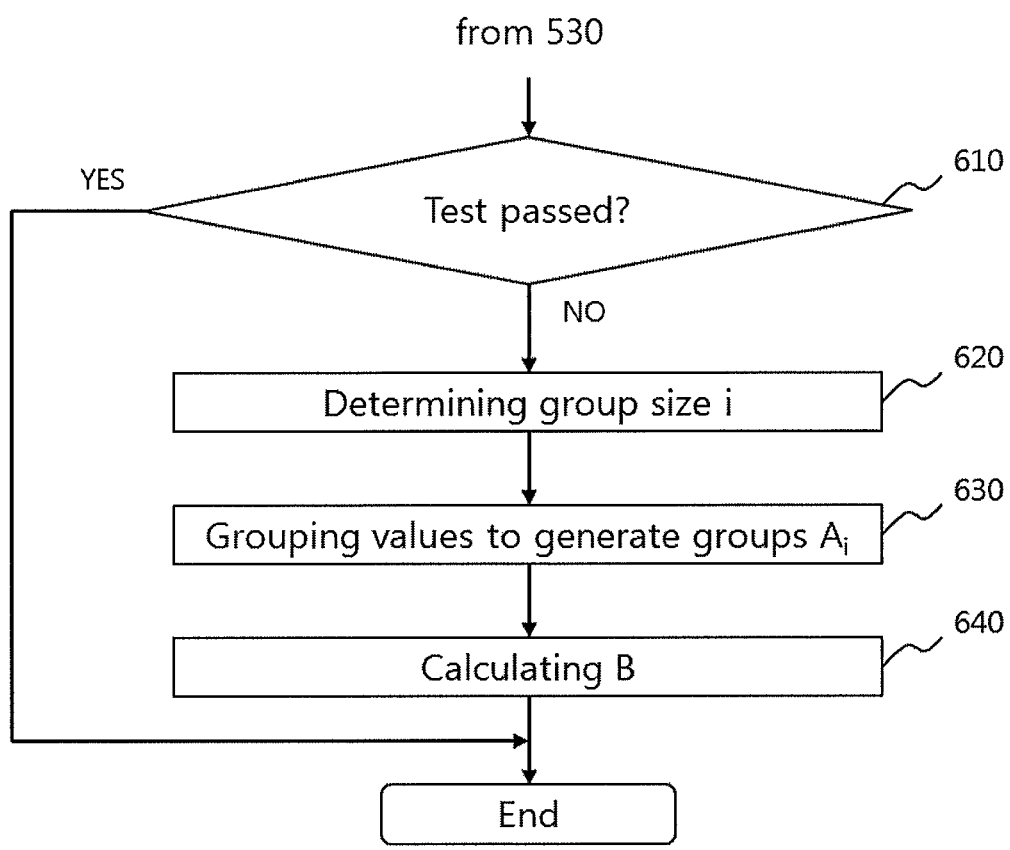
FIG. 6 is a flowchart further illustrating the digital value processing method of FIG. 5 according to an embodiment.

FIG. 6 is a flowchart further illustrating the digital value processing method of FIG. 5.

Referring to FIG. 6, in operation 610, whether the first digital value A passes a given random test may be determined. For example, when the first digital value A passes the random test when only an n-bit sequence included in the first digital value A is selected, the n-bit sequence may be determined as a second digital value B. The n-bit sequence may be, for example, designated in advance or may be arbitrarily selected.

However, when the first digital value A is determined not to pass the random test in operation 610, a group size i used to generate an n-bit random sequence may be determined in operation 620.

The group size i may be determined as a minimum natural number corresponding to a P-value calculated based on Equation 5 that exceeds the threshold.

In operation 630, the grouping unit 120 of FIG. 1 may generate n groups, each including i bits, by segmenting a bit sequence included in the first digital value A. The n groups may be, for example, the groups $A_1$ through $A_n$ of FIG. 4.

In operation 640, the processing unit 130 of FIG. 1 may perform an XOR operation of i bits in each of the n groups, and may calculate a 1-bit sequence of a 1 bit for each of the n groups. Accordingly, the second digital value B including n bits corresponding to the n groups may be generated.

As described above, according to embodiments, even when a probability p that each of bits in a first digital value A initially generated by a PUF is "1" does not reach 50%, an entropy of a second digital value B generated by the digital value processing apparatus 100 may be greatly enhanced. Thus, randomness of the second digital value B may also be increased.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A digital value processing apparatus, comprising:
a determining circuit to receive a first digital value having a first bit sequence including a first number of bits, the first digital value being based on a presence or absence of shorts between circuit elements in a physically unclonable function (PUF) circuit, the determining circuit including a reading circuit to read the first bit sequence and calculate a ratio of bit values "1" and "0" included in the first bit sequence;

a grouping circuit to generate a plurality of groups by segmenting the first bit sequence, a number of groups in the plurality of groups corresponding to a second number of bits in a second digital value, each group in the plurality of groups including a third number of bits; and a processing circuit to generate the second digital value from the plurality of groups by performing a logical operation, wherein the determining circuit determines the third number of the bits included in each group based on the ratio calculated by the reading circuit, the second number of bits in the second digital value, and a predesignated level of randomness.

2. The digital value processing apparatus of claim 1, wherein the logical operation is an eXclusive OR (XOR) operation.

3. The digital value processing apparatus of claim 1, wherein the determining circuit determines whether a level of randomness of the first digital value exceeds a predesignated threshold.

4. The digital value processing apparatus of claim 3, wherein the level of randomness includes a P-value calculated for the first bit sequence.

5. The digital value processing apparatus of claim 1, wherein the determining circuit determines the number of the groups in the plurality of groups, by reading the first bit sequence.

6. The digital value processing apparatus of claim 5, wherein the determining circuit comprises:

a calculating circuit to determine the third number of bits such that a P-value for the second digital value calculated based on the ratio exceeds a predesignated threshold.

7. A digital value processing method, comprising:

determining, by a determining circuit, a presence or absence of shorts between circuit elements in a physically unclonable function (PUF) circuit;

receiving, by the determining circuit, a first digital value having a first bit sequence including a first number of bits, the first digital value being based on the presence or the absence of the shorts;

determining by a reading circuit a ratio of bit values "1" and "0" included in the first bit sequence;

generating, by a grouping circuit, a plurality of groups by segmenting the first bit sequence, a number of groups in the plurality of groups corresponding to a second number of bits in a second digital value, each group in the plurality of groups including a third number of bits; and generating, by a processing circuit, the second digital value from the plurality of groups by performing a logical operation, wherein the determining circuit determines the third number of the bits included in each group based on the ratio calculated by the reading circuit, the second number of bits in the second digital value, and a predesignated level of randomness.

8. The digital value processing method of claim 7, wherein the logical operation is an eXclusive OR (XOR) operation.

9. The digital value processing method of claim 7, further comprising:

reading, by a determining circuit, the first bit sequence, and determining whether a level of randomness of the first digital value exceeds a predesignated threshold.

10. The digital value processing method of claim 9, wherein the level of randomness includes a P-value calculated for the first bit sequence.

11. The digital value processing method of claim 7, further comprising:

determining, by the determining circuit, the number of groups in the plurality of groups, by reading the first bit sequence.

12. The digital value processing method of claim 11, wherein the determining comprises:

determining the third number of bits such that a P-value for the second bit sequence calculated based on the ratio exceeds a predesignated threshold.

* * * * *